United States Patent

[11] 3,522,817

| [72] | Inventor: | Robert E. Raymond<br>Zanesville, Ohio |
|---|---|---|
| [21] | Application No.: | 760,428 |
| [22] | Filed: | Sept. 18, 1968 |
| [45] | Patented: | Aug. 4, 1970 |
| [73] | Assignee: | International Basic Economy<br>Corporation<br>New York, New York<br>a Corp. of New York |

[54] MULTIPLE DETECTOR PRESSURE CONTROL VALVE
12 Claims, 6 Drawing Figs.

[52] U.S. Cl. .................................................. 137/489,
137/495, 251/26
[51] Int. Cl. ...................................................... F16k 17/10
[50] Field of Search ........................................ 137/495;
108, 115, 489; 251/26; 137/491, 489.3

[56] References Cited
UNITED STATES PATENTS

| 1,014,435 | 1/1912 | Auld et al. ..................... | 137/489.3 |
| 2,467,576 | 4/1949 | Zimmermann ............... | 137/115X |
| 3,180,355 | 4/1965 | Long ............................. | 251/26X |

FOREIGN PATENTS

| 965,656 | 8/1964 | Great Britain............. | 137/108 |

Primary Examiner— M. Cary Nelson
Assistant Examiner – R. B. Rothman
Attorney— Schmieding and Fultz ABSTRACT: A hydraulic pressure control valve that consists of a main amplifier spool element for modulating a control flow and a plurality of detector and preamplifier spool elements each of which is arranged to detect separate pressure signals and transmit same to the main amplifier spool element to modify the operation thereof responsive to variations in said pressure signals.

INVENTOR.
ROBERT E. RAYMOND
BY
Schmieding & Sultz
ATTORNEYS

INVENTOR.
ROBERT E. RAYMOND
BY
Schmieding & Fultz
ATTORNEYS

INVENTOR.
ROBERT E. RAYMOND

BY Schmieding + Fultz

ATTORNEYS

U.S. PATENT 3,522,817
MULTIPLE DETECTOR PRESSURE CONTROL VALVE

This invention relates to pressure control valves, and more particularly to such a device that is operated responsive to a plurality of detected pressure signals.

In general, the apparatus of the present invention comprises a multiple spool pressure control valve which includes a main control amplifier spool element that is capable of modulating fluid flow to a load until detected pressure signals are applied to the ends of the amplifier spool and utilized to control its operation. Such spool ends are balanced in area, biased with springs and hydraulically operated by said pressure signals.

In accordance with the present invention, the control is accomplished with a plurality of detector and preamplifier spool elements that regulate the control amplifier modulator flow responsive to a plurality of respective pressure signals. These detector elements can be selectively arranged to receive their respective signals from inside the pressure control valve, from some external pressure source, or from combinations of these.

Through the use of such multiple detector elements a wide variety of control combinations can be arranged with a main control amplifier spool element. This is achieved within a compact efficient envelope in the form of a single valve housing arranged to receive either internal or external signals with each detector spool element being arranged to receive and be actuated by only its own respective pressure signal.

Prior to the present invention, conventional pilot operated controls have utilized poppet or ball type detector elements which can perform a direct measurement of pressure and draw a control flow so that a pressure drop across an orifice will operate a main control valve element. Such poppet or ball type detectors are, however, extremely limited in being in the pressure system they operate and are not capable of pressure differential control, but only absolute pressure control. Also external pressure signals cannot be conveniently handled by a poppet or ball type detector since they are not balanced like a spool type detector.

Therefore, as an aspect of the present invention the detector spools can receive pilot pressure signals or spring forces on either end, or control forces from other means of actuation all of which are completely divorced from the pressure system being controlled. As a result, extremely versatile pressure control is achieved.

As another aspect of the present invention the multiple pressure control valve can be arranged as a relief valve with the main control amplifier spool connected to release fluid from a hydraulic system. With this arrangement, one of the detector preamplifiers is connected to sense line pressure of the relief flow and arranged as the pilot control for said main control amplifier spool. At the same time, a second detector preamplifier is programmed to receive an external signal and override the maximum setting by the first detector preamplifier when external pressure signals are applied. As a result the two detectors and preamplifiers are controlling the same main control amplifier spool with the lower pressure commander having priority.

Modifications are possible such as providing one detector preamplifier with a differential pressure by measuring the pressure drop across an orifice in a hydraulic line so that the function is converted to a flow control principle with one priority detector preamplifier essentially forcing the main control amplifier spool to act as a flow control by-pass for maintaining flow through the orifice at a constant pressure drop and with the other pilot detector preamplifier measuring the absolute line pressure so that when such pressure reaches a preset value the main control amplifier spool functions as a pressure relief valve. This means that the device functions as a combination flow control and pressure relief valve utilizing the inter-related functions of the same basic components to achieve both functions.

It will be understood that various other modifications can readily be established by changing the connections of the multiple detector preamplifiers so as to detect various selected combinations of pressure signals.

It is, therefor, an object of the present invention to provide a novel pressure control valve wherein a main control amplifier spool and a plurality of detector preamplifier spools cooperate in a unique manner to achieve multiple control functions.

It is another object of the present invention to provide an apparatus of the type described wherein the same basic control elements cooperate in a unique manner whereby certain of the elements each performs multiple functions of control.

It is another object of the present invention to provide a novel pressure control valve that is operated by a plurality of separate pressure signals with certain of said signals having priority in the operation of a main control amplifier for the system.

It is another object of the present invention to provide a novel pressure control valve that functions as a combination flow control and pressure relief valve and which utilizes the inter-related operation of the same basic spool components to achieve both functions.

Further objects and advantages of the present invention will be apparent from the following description, reference being had to the accompanying drawings wherein a preferred form of embodiment of the invention is clearly shown.

Figure 1:
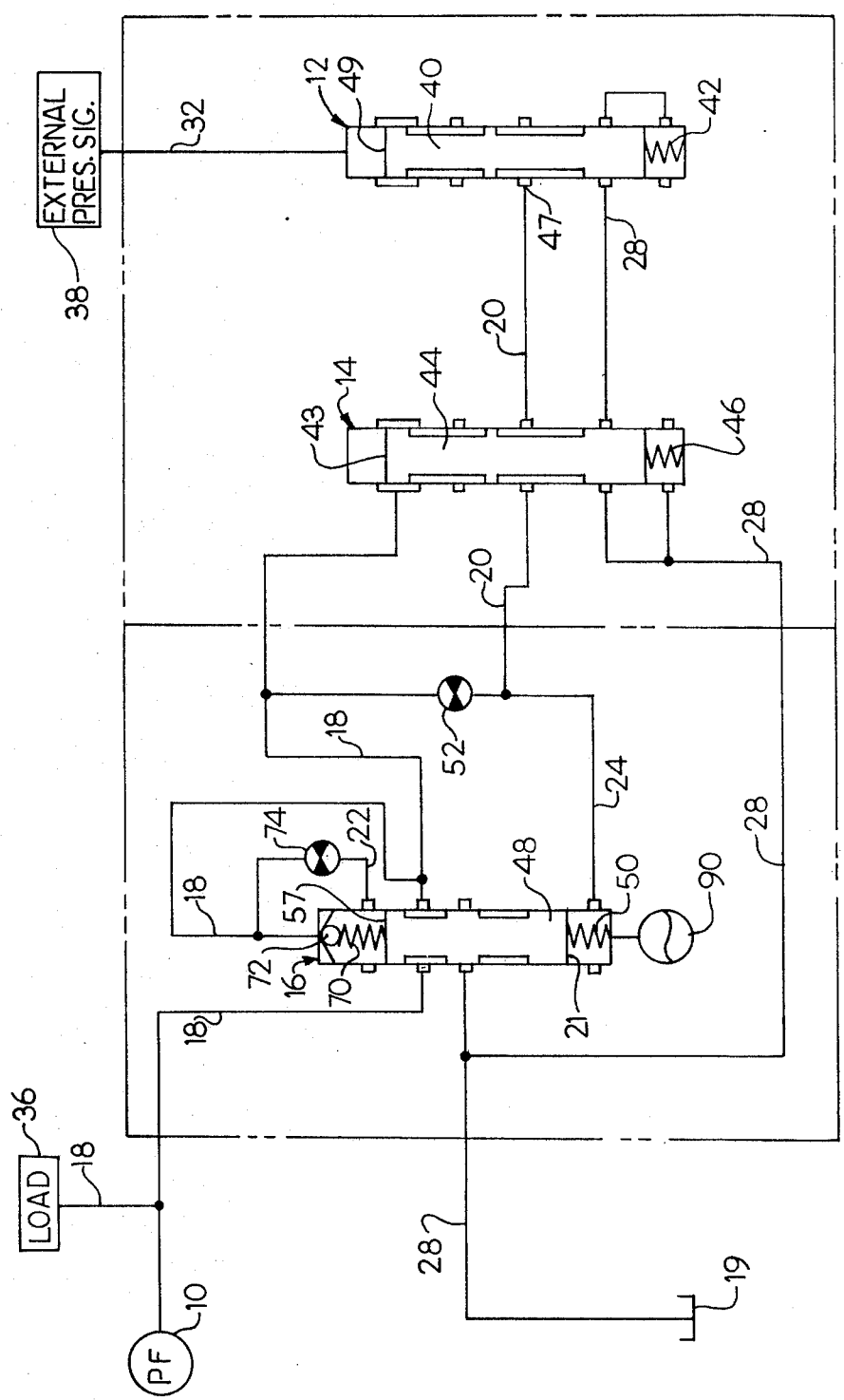
FIG. 1 is a diagrammatic view of a multiple pressure control valve constructed in accordance with the present invention.

Referring in detail to the drawings, FIG. 1 is a diagrammatic view of the device with separate internal and external pressure signals arranged to respectively operate two detector preamplifiers. In this modification the device is operating only as a pressure controller.

As seen in FIG. 1, a pump 10 is connected to line 18 which is connected to a system load 36 and also to the inlet of a control amplifier 16. The latter includes a normally closed control amplifier spool 48 which when shifted to an open position connects line 18 to reservoir 19 via line 28. This occurs when a pressure differential across an orifice 52 causes an increase in pressure in line 18 and on the top end 57 of spool 48. This causes the spool to open against the force of a spring 50 thereby modulating the flow across spool 48, to reservoir 19.

In normal operation control amplifier 16 functions as a high pressure relief valve, the limit and operation of which is as follows. A detector and preamplifier 14 is programmed to act as a pilot control via line 20 to the bottom end 21 of control amplifier spool 48.

When the pressure in line 18 reaches a preset level determined by spring 46 acting on a detector spool 44, then the fluid force on upper end 43 of spool 44 moves the spool to an open position in a modulating manner thereby connecting line 20 to line 28 and reservoir. This action permits a control flow to flow from line 18 through orifice 52 to line 20. When this control flow reaches certain limits a pressure difference is created across spool 48 to oppose spring 50 in control amplifier 16 and spool 48 begins to open line 18 to line 28 and reservoir thereby by-passing the flow from line 18 to tank. In this sense there is a pilot operation of control amplifier spool 48 to effect pressure control in a modulating manner.

Reference is next made to a second detector preamplifier 12 having an inlet 47 connected to line 20 which is in turn connected to line 28 and reservoir by the opening action of spool 40 against the bias force of spring 42.

This detector preamplifier is actuated by a pressure signal applied at line 32 from some external pilot source 38. If such pilot source were to be from the main line pressure 18 then the device will function as a pilot pressure control of the main line pressure wherein one pilot such as detector preamplifier 14 can be set at a high level, for example 1500 psi, and the other detector preamplifier 12 made variable between for example 0 and 1500 psi. This would constitute one option.

Reference is next made to various elements that are used in the circuit for damping functions to supplement the main circuit operation described above.

As seen in FIG. 1, the main flow from the pump in line 18 communicates with the upper end 57 of control amplifier spool 48 through a check valve 72 that is normally biased closed by a spring 70. When flow occurs in line 18 it is free to move into the top chamber of control amplifier 16 and pressurize top spool end 57 due to the opening of check valve 72 by fluid pressure. However, when spool 48 tends to move in the reverse direction responsive to lower spring 50 then check valve 72 is biased closed due to the flow restricting action of a damping orifice 74. Hence it is understood that the spool is adapted to open fast but its closing or resetting action is retarded. As a result wild oscillations and chatter of the spool 48 are prevented in the event parasitic effects such jet forces might occur in the system.

With continued reference to FIG. 1, orifice 52 communicates with a capacitance chamber 90 which contains a volume of oil and thereby provides resiliency on the bottom 21 of control amplifier spool 48. Hence, even though the oil is of low compressibility, the control amplifier spool 48 can be forced open rapidly at the same time oil is restricted from flowing to detector preamplifier 14 due to the resistance of orifice 52. This isolates the ends of the spool from pump pulsation and it will be understood that the resilient chamber 90 and resistance of the orifice function as a resistance capacitance network that tends to filter pulses and provide additional stability to the spool.

Reference is next made to FIGS. 2 through 6 which illustrate the structural arrangement of the components of the multiple detector pressure control valve of the present invention.

Figures 2, 3:
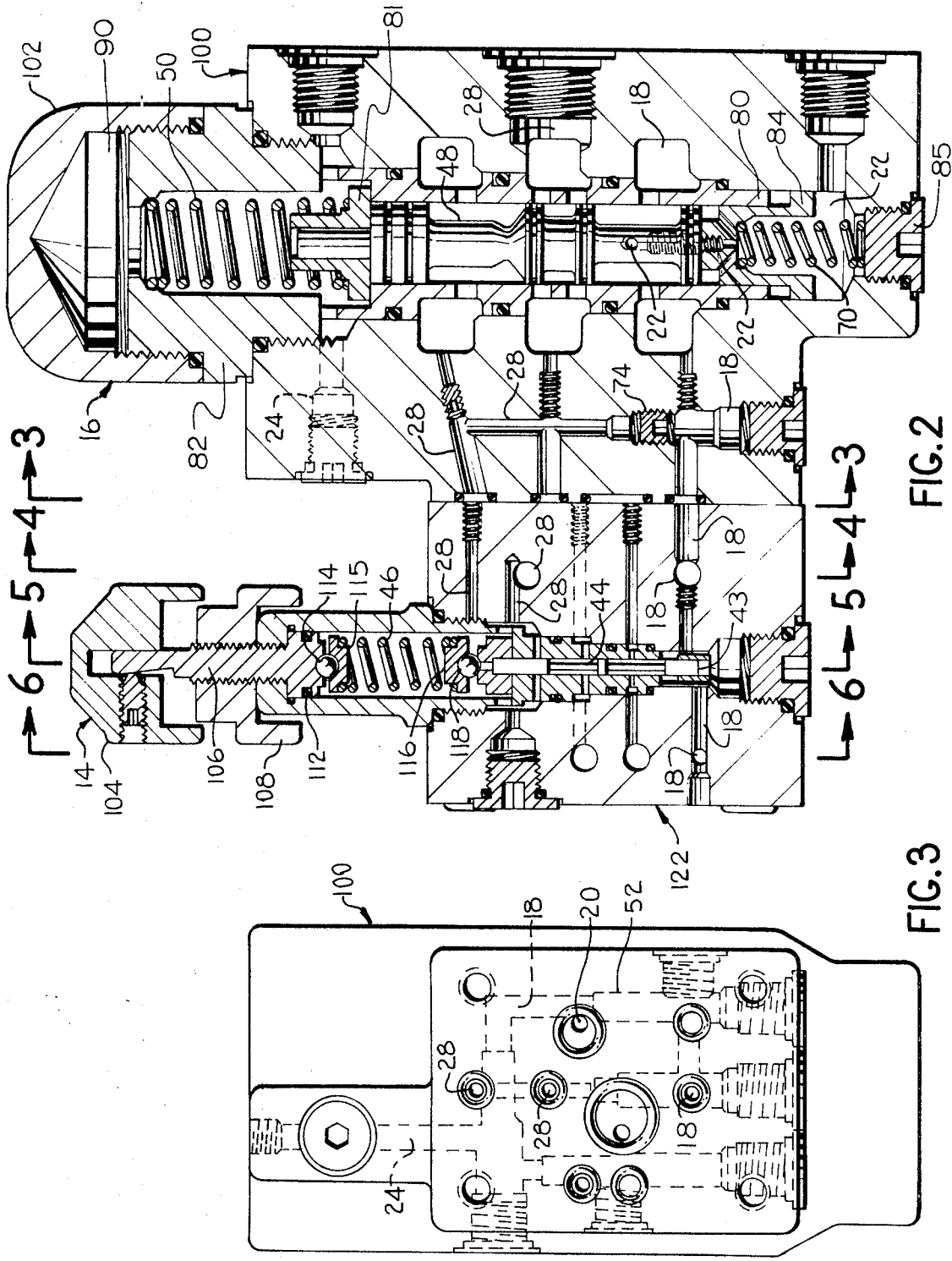
FIG. 2 is a side sectional view of the valve of FIG. 1, the section being taken along the line 2--2 of FIG. 3.
FIG. 3 is a front sectional view of the valve of FIG. 1, the section being taken along the line 3--3 of FIG. 2.
Figure 6:
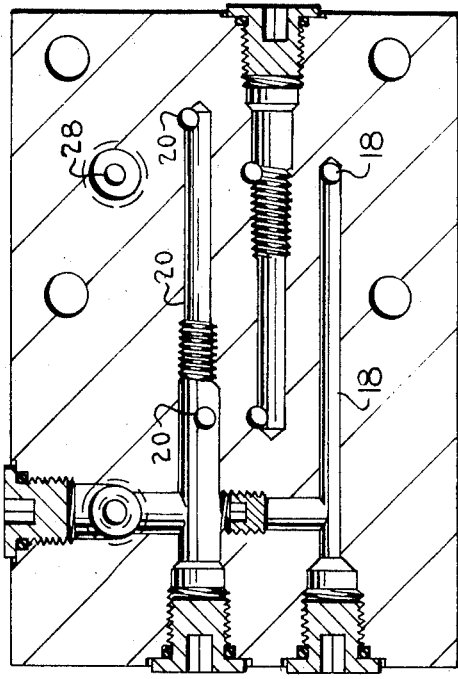
FIGS. 4 through 6 are sectional views of the valve of the preceeding figure, said sections being taken along the lines designated by the respective figure numbers.
Figure 4:
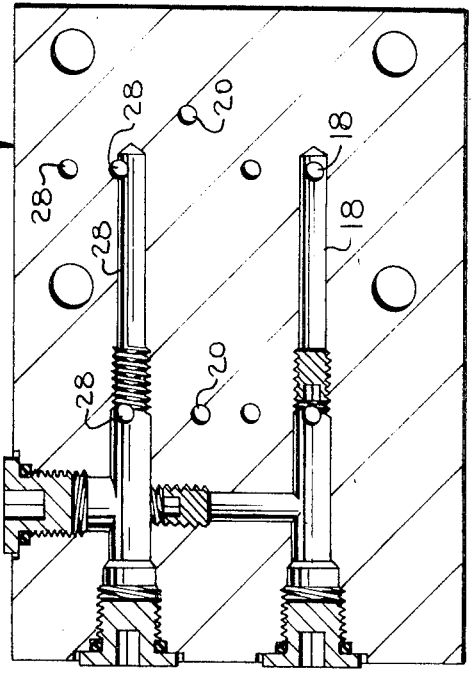

As is best seen in FIG. 2 the device comprises a main housing indicated generally at 100 on which is mounted an auxiliary housing 122.

As seen in FIG. 2; main housing 100 includes a sleeve 80 provided with a bore in which previously mentioned control amplifier spool 48 is shiftably mounted. One end of spool 48 is biased by spring 50, the lower of which engages a spring retainer 81, and the upper end of spring 50 is retained by a fitting 82 screwed into main housing 100.

A metal dome 102 forms the previously described capacitor chamber 90 which consists of a volume of oil.

With continued reference to FIG. 2; the other end of spool 48 is biased by spring 70 the other upper end of which engages a spring retainer 84, the lower end of spring 70 abutting a removable plug 85.

Figure 5:
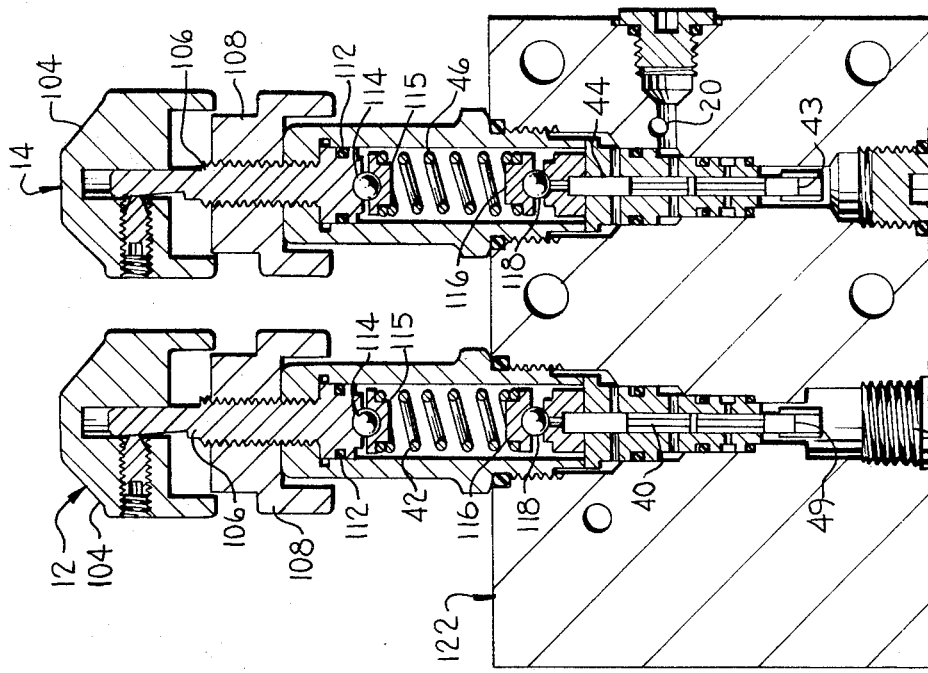

Reference is next made to FIGS. 2 and 5 which best illustrate the two detector and preamplifiers 14 and 12. Each of these preamplifiers includes a manual control knob 104 adapted to longitudinally adjust a threaded spring bias rod 106. The lower end of each rod 106 drives an upper spring retainer 115 via a bearing 114, and the lower ends of each of the springs 42 and 46 includes a lower spring retainer 116 which biases a lower ball 118, the latter being in force transmitting relationship with a respective one of the spools 40 or 44.

As seen in FIG. 5, the lower end 49 of spool 40 communicates with conduit 32, FIG. 1, leading to external pressure signal 38.

With reference to FIG. 2, the lower end 43 of spool 44 is exposed to the fluid pressure in conduit 18.

It should further be mentioned that the various ports and passages illustrated and described in FIG. 1 also appear in the structural views of FIGS. 2 through 6 and are designated by corresponding numerals.

I claim:

1. A multiple detector pressure control valve comprising housing means; a control amplifier means including a normally closed control amplifier spool, an inlet for connection with a load, an outlet for connection with reservoir, a first amplifier control port for one end of said control amplifier spool, a second amplifier control port for the other end of said amplifier spool, and amplifier bias spring means on said other end of said amplifier spool; a first detector means including a normally closed first detector spool, an inlet, an outlet communicating with reservoir, a first detector spool end, spring means biasing said first detector spool end, and a second detector spool end communicating with a first detector port; a second detector means including a normally closed second detector spool, an inlet, an outlet communicating with reservoir, a first end on said second detector spool, spring means biasing said first spool end, and a second detector spool end communicating with a second detector port; orifice means; first conduit means connecting said control amplifier inlet and said first control port on said one end of said amplifier spool with one side of said orifice means; second conduit means connecting said two detector means inlets and said second control port on said other end of said amplifier spool with the other side of said orifice means; a first detector conduit connecting said first detector port with a first pressure signal; and a second detector conduit connecting said second detector port with a second pressure signal.

2. The multiple detector pressure control valve of Claim 1 wherein one of said detector conduits communicates with an internal pressure signal and the other of said detector conduits communicates with a second pressure signal from an external pilot.

3. The multiple detector pressure control valve of Claim 1 wherein said two detector conduits are respectively connected to separate internal pressure signals.

4. The multiple detector pressure control valve of Claim 1 wherein said two detector conduits are respectively connected to separate external pressure signals.

5. The multiple detector pressure control valve of Claim 1 wherein one of said detector conduits communicates with an internal pressure signal from said load and the other of said detector conduits communicates with a pressure signal from an external pilot.

6. The multiple detector pressure control valve of Claim 1 wherein one of said detector conduits communicates with an internal pressure signal from said load and the other of said detector conduits communicates with a second internal pressure signal.

7. A multiple detector pressure control valve comprising, in combination, control amplifier means including an amplifier inlet for connection with a source of pressurized fluid and a load, a normally closed spool for controlling the flow to said inlet, a first amplifier control port for one end of said spool, and a second amplifier control port for the other end of said spool, and an amplifier spring on said other end of said spool; a plurality of separate detector means each of which includes a normally closed spool controlled detector inlet communicating with the spring biased end of said amplifier spool, a normally closed detector outlet, and a detector control port connecting an end of a respective detector spool with a pressure signal; conduit means connecting said amplifier control ports, detector inlets and amplifier inlet; and an orifice for establishing a pressure drop in said conduit means between said amplifier inlet and said second amplifier control port.

8. The multiple detector pressure control valve of Claim 7 wherein certain of said detector control ports communicate with an internal pressure signal and certain other of said detector control ports communicate with a second separate pressure signal from an external pilot.

9. The multiple detector pressure control valve of Claim 7 wherein certain of said detector control ports communicate with an internal pressure signal and certain other of said detector control ports communicate with a second separate internal pressure signal.

10. The multiple detector pressure control valve of Claim 7 wherein certain of said detector control ports communicate with a pressure signal from an external pilot, and certain other of said detector control ports communicate with a second pressure signal from a second external pilot.

11. The multiple detector pressure control valve of Claim 7 wherein one of said detector control ports communicates with an internal pressure signal from said load, and wherein certain other of said detector control ports communicate with a second separate internal pressure signal.

12. The multiple detector pressure control valve of Claim 7 wherein one of said detector control ports communicates with an internal pressure signal from said load, and wherein certain other of said detector control ports communicate with a second separate pressure signal from an external pilot.